United States Patent [19]
Padgett

[11] Patent Number: 4,677,610
[45] Date of Patent: Jun. 30, 1987

[54] THREE-PORT CONFERENCE CIRCUIT FOR USE IN A DIGITAL TELEPHONE SYSTEM
[75] Inventor: Richard A. Padgett, Lombard, Ill.
[73] Assignee: GTE Communication Systems Corporation, Phoenix, Ariz.
[21] Appl. No.: 785,137
[22] Filed: Oct. 7, 1985
[51] Int. Cl.$^4$ ............................................. H04Q 11/04
[52] U.S. Cl. ...................................... 370/62; 379/202
[58] Field of Search ........................ 370/62; 179/18 BC
[56] References Cited
U.S. PATENT DOCUMENTS 3,967,070  6/1976  Srivastava et al. ............ 179/18 BC
4,301,531 11/1981  Lubin ..................................... 370/62
4,393,496  7/1983  Zeiträeg ................................. 370/62

Primary Examiner—Douglas W. Olms
Assistant Examiner—Wellington Chin
Attorney, Agent, or Firm—Gregory G. Hendricks; Charles A. Doktycz

[57] ABSTRACT

A three-port conference circuit for use in a pulse code modulated communication system including a first speaker register including an input connected to a telephone system information memory output and including an output, a second speaker register including an input connected to the telephone system information memory output and including an output and a conference adder connected to the first and second speaker register outputs via inputs and including an output connected to a sample inverting circuit of the telephone system. The conference adder adds talking samples by means of an included eight-bit floating point adder.

6 Claims, 2 Drawing Figures

THREE-PORT CONFERENCE CIRCUIT FOR USE IN A DIGITAL TELEPHONE SYSTEM

BACKGROUND OF THE INVENTION

1. Field of the Invention

This invention relates generally to transmission and switching techniques in telephone communication systems and, more particularly, to an improved conference technique whereby a number of channels in a telephone switching system employing pulse code modulation (PCM) for transmission purposes are combined so that a number of subscribers may participate in a common telephone conversation. It also relates to improvements in a three-port conference circuit of the type disclosed in U.S. Pat. Nos. 3,699,264 and 4,007,338 both of which are assigned to the same assignee as the present invention.

2. Background Art

An approach to handling of pulse code modulated information and conference circuitry is taught by U.S. Pat. Nos. 3,699,264 and 4,007,338. In these patents, digital signals are not converted to analog; rather binary words are compared from the participating channels, with the smallest binary numbers (this corresponds to the largest analog signal) selected as the speaker with all other parties of the conference designated listeners. The speaker's speech sample is distributed as a listening sample to all the conference listeners. The conference circuit, in U.S. Pat. No. 4,007,338, determines the loudest PCM voice sample (smallest binary number) during each PCM time frame, storing and outputting the selected PCM code to all conferees. This technique, called "instant speaker selection", for generating conferencing however, is subject to degradation due to the presence of idle channel noise and DC offset voltage variations from non-talking conferees talking over the speaker when the speaker's audio signal passes through a null and its PCM sample is represented by a high numeric value. In addition, when two or more conference members are conversing simultaneously, the conference circuit could alternately and sporadically select a new speaker during each successive time frame, thus degrading the quality of the speech heard by the conversing conferees.

Various improvements in the conference circuitry disclosed in the above-identified U.S. patents are disclosed in U.S. Pat. Nos. 4,002,981 and 4,054,755, both of which are also assigned to the same assignee as the present invention.

In U.S. Pat. No. 4,022,981, an improved multi-port (more than 3) conference circuit is disclosed utilizing a minimum binary code as employed in the coding formats (D2 and D3) currently employed in pulse code modulated telephony. Generally, the method of choosing the speaker here is to clear the PCM buffers at the end of a time slot frame. then, when the first conferee is detected, its speech sample is loaded into a conferee register. The conferee register is then compared to a temporary speaker register and if of larger amplitude (smaller binary PCM code value), the conferee register sample is loaded into the temporary speaker register. If the sample in the conferee register is not of larger amplitude register, it is written over when the next conferee sample is loaded into the conferee register. Each new conferee sample is thus compared to the temporary speaker register to determine which conferee has the largest amplitude sample for a given frame. Finally, at the end of a given frame, the temporary speaker register is transferred to a conference speaker register and becomes the conference speaker sample which all conferees except the speaker himself will receive during the next frame.

In U.S. Pat. No. 4,054,755, further improvements in a multi-port conference circuit are provided. These improvements attempt to solve the idle channel noise, the circuit offset variation problem and also provide foreign signal protection (i.e., 60 Hz signal longitudinally coupled to the line).

In this conference circuit, PCM samples are taken for each conferee from the time switch and, via comparator circuits, a PCM sample is selected for sending to the conferee. The selected PCM sample is not determined until all samples within a frame are compared which results in all conferees except the selected conferee receiving the selected PCM sample during the next succeeding frame. The conferee whose sample was selected will receive a null code (perfect idle channel). To minimize speech clipping or selecting noise, two circuits, a preliminary and a preferred speaker preference circuit, are employed.

The preliminary preference circuit utilizes the identity of the previous selected speaker and after its PCM sample is compared, its binary weight is modified to the highest value of a corresponding curve segment. This is done by adding a bit between the segment and the step bits, causing the binary value of the step to be decreased thereby increasing the sample's amplitude. This technique permits the conference circuit to hold on to the previous speaker if the incoming PCM samples are below or in the same PCM segment or in value.

The preferred speaker preference circuit functions to prefer a selected speaker when the magnitude of the selected speaker PCM sample exceeds a preferred speaker preference circuit threshold. In this regard, when a speaker sample is selected during a given frame for use as the selected speaker during the succeeding frame and the sample has a larger PAM (smaller PCM code) sample than the threshold, the preferred preference circuit adjusts the selected speaker sample to a lower binary weight (appaently larger PAM sample value) when sending it to the comparator, during the succeeding frame. This reduces speech clipping during that time when two or more conferees are conversing simultaneously by giving preference to the conferee presently designated speaker of the conference.

Neither the preliminary nor the preferred preference circuits alters the incoming or the outgoing PCM sample to the conferees; the additional binary weights are only presented to the comparison circuit for the purpose of favoring the previous speaker.

U.S. Pat. No. 4,126,766 teaches improvements in the conference circuit taught in the above-referenced U.S. Patents to reduce or substantially eliminate the problem of high idle channel noise resulting from always choosing the largest signal above null code (quiet or absence of signal).

This invention provides a three-port conference circuit which includes a plurality of time slots, during which each of two port samples may be compared with a strapped threshold and with each other to determine which is to be selected as the speaker for the purpose of transmission of that port's sample to a third port.

If the sample of one of the two compared ports exceeds the threshold and simultaneously is greater than the other compared port's sample when the other port is designated the speaker from the last frame in a last frame speaker memory, that port will be designated the speaker for this frame, its sample will be transmitted to the third port and it will be designated the speaker in the last frame speaker memory. For all other conditions, the port designated the speaker in the last frame speaker memory will remain the speaker and its sample will be transmitted to the third port. This speaker selection will take place separately for each of the parties of a three-way conference during that party's time slot.

A method of conferencing, described in the GTE Automatic Electric Technical Journal (Vol. 13, No. 2, page 71) is taught wherein eight-bit PCM code samples are converted to 13-bit linear code, the conference samples added, and the sum reconverted back to eight-bit PCM code. Such a method suffers from distortion caused by loss of sample accuracy when, in the process of reconverting the sum back to an eight-bit PCM sample, surplus bits are discarded.

U.S. Pat. No. 4,109,111 issued Aug. 22, 1978 to Cook teaches a pulse code modulation, time division multiplex conferencing system providing to each party a signal indicative of the linear sum of the samples from all other parties, such signals generated by accumulating the sum of all samples from all parties then generating an output signal to a particular party by subtracting from the sum the contribution of the particular party. The cumulative sum is updated upon receipt of each new sample.

Such an arrangement while operating generally satisfactorily requires the conversion of each sample from PCM format to a linear format in order to perform the arithmetic operations described. Additionally, time consuming and complex circuitry is required for such conversion.

SUMMARY OF THE INVENTION

The present invention pertains to a threeport conference circuit for use in private automatic branch exchange similar to those units manufactured by GTE Communication Systems Corporation and designated GTD-120 and the OMNI series of PABX's. The circuitry with minimum modification could also be employed in class five central offices such as GTD5 EAX also manufactured by GTE Communication Systems Corporation that employ digital switching and a time switching network.

In time division switching networks a requirement exists to have sources of pulse code modulated voice samples associated with time slots. These time slots allow the conference circuit to sequentially receive the voice samples for each conferee. For the conference circuit to be effective, it must be able to recognize which conferees are associated with the conference. Information of this sort is of course, available in the telephone switching systems referred to above. The circuitry must also be capable of distributing a signal representative of the other conferee's to each conferee. Finally, it should be understood that only telephone switching systems employing D2/D3 type pulse code modulation can use the circuitry of the present invention.

The present invention provides a three-port conference circuit for use in a pulse code modulated communication system. The conference circuit includes an output, a first speaker register including an input connected to an information memory output of the communication system and a control line input connected to a communication system control circuit. The conference circuit also includes a second speaker register including an input connected to the information memory output, control line inputs connected to the control means and an output. Finally, the conference circuit includes a conference adder connected to the first and second speaker register outputs by coresponding inputs and including a output connected to a sample inverting circuit of the communication system. The conference adder adds talking samples by means of an included eight-bit floating point adder.

BRIEF DESCRIPTION OF THE DRAWING

An understanding of the present invention may be had from the following description taken in conjunction with the accompanying drawing in which.

DESCRIPTION OF THE PREFERRED EMBODIMENT

Figure 1:
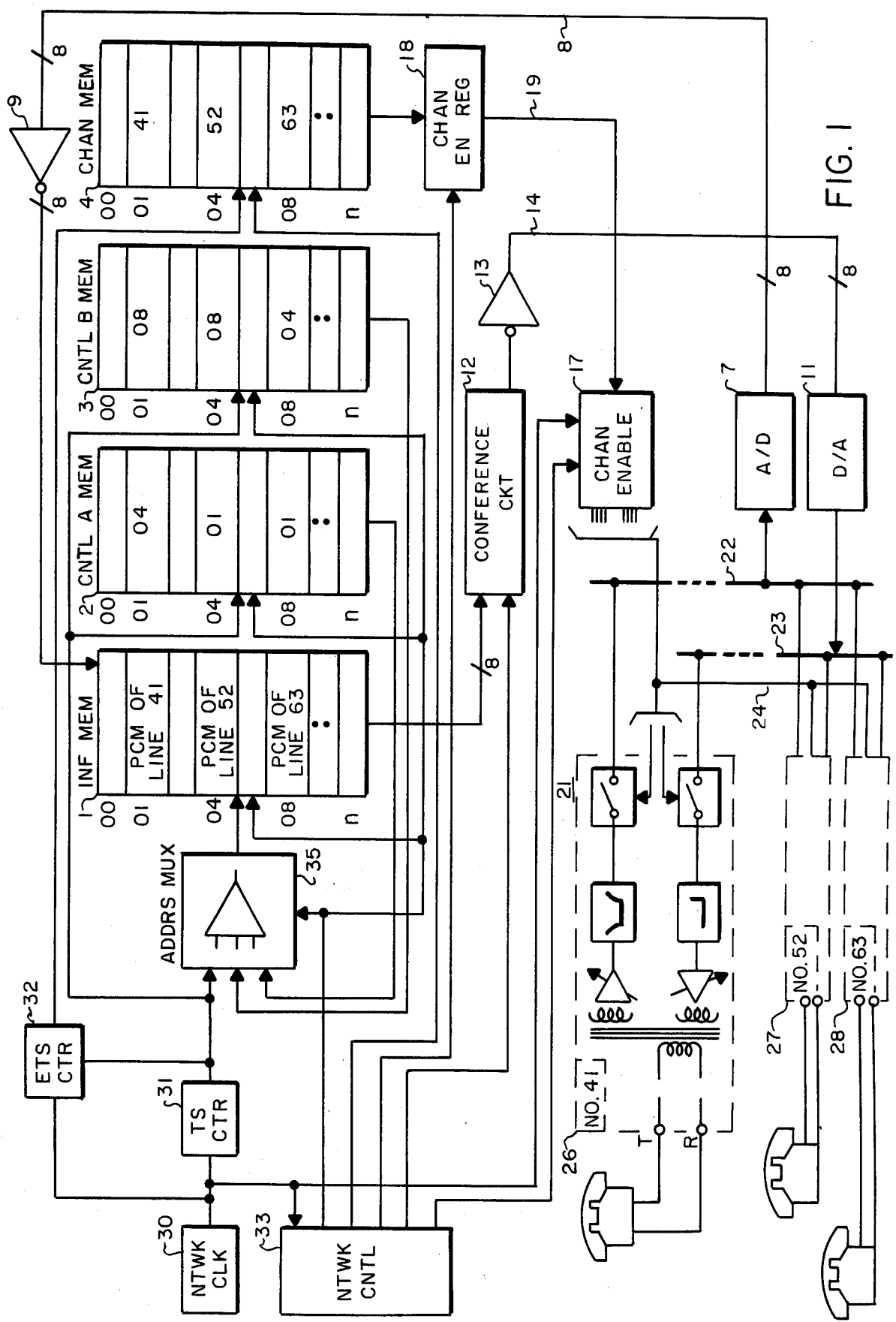
FIG. 1 is a block diagram of those portions of a pulse code modulated switching network pertinent to the present invention.

Referring now to FIG. 1 there are shown those portions of a PABX switching network employing pulse code modulated transmission techniques and digital switching on a time division basis which interface with the conference circuit of the present invention. As shown, such circuitry includes an information memory 1, a control A memory 2, a control B memory 3, and a channel memory 4. also included in the PABX is an analog-to-digital (A/D) converter 7 connected to an input of the information memory 1 by a PCM input bus 8 and a PCM talking sample signal inverter circuit 9. A digital-to-analog (D/A) converter 11 is included and connected to an output of the information memory 1 via a conference circuit 12, a PCM listening sample inverter circuit 13 and a PCM output bus 14. A channel enable circuit 17 is connected to an output of the channel memory 4 via a channel enable register 18 and a channel enable bus 19.

A plurality of subscriber line circuits 21 are provided and connected to the analog-to-digital converter 7 by means of a transmit pulse amplitude modulation (PAM) bus 22, to the digital-to-analog converter 11 by means of a receive PAM bus 23 and to the channel enable circuit 17 by means of a line circuit enable bus 24. In this regard, a first subscriber line circuit 26, a second subscriber line circuit 27 and a third subscriber line circuit 28, all of the subscriber line circuits 21, each include a circuit connection to the transmit PAM bus 22, the receive PAM bus 23 and the line circuit enable bus 24.

A network clock 30 is included, is connected to and provides a source of clock signals to drive a time slot counter 31, an early time slot counter 32, a network control 33 and the channel enable circuit 17. The time slot counter 31 is connected to and generates time slot addresses for the information memory 1, the channel A memory 2 and the channel B memory 3.

Connected between the time slot counter 31 and a first address input of the information memory 1 is an address multiplexer 35. The address multiplexer 35 includes a second input connected to an output of the control A memory 2 and a third input connected to the control B memory 3. The time slot, counter 31 is additionally connected to an early time slot counter 32 which includes an output connected to the channel memory 4. Finally, the network control 33 is connected to inputs of the address multiplexer 35, the information memory 1, the control A memory 2, the control B memory 3, the channel memory 4, the channel enable register 18, the conference circuit 12 and the channel enable circuit 17. It should be noted that the detailed circuit configurations of the described above circuitry has not been shown in as much as it does not form a portion of the present invention and is well within the capability of those skilled in the art to implement such circuitry from commercially available logic devices.

Figure 2:
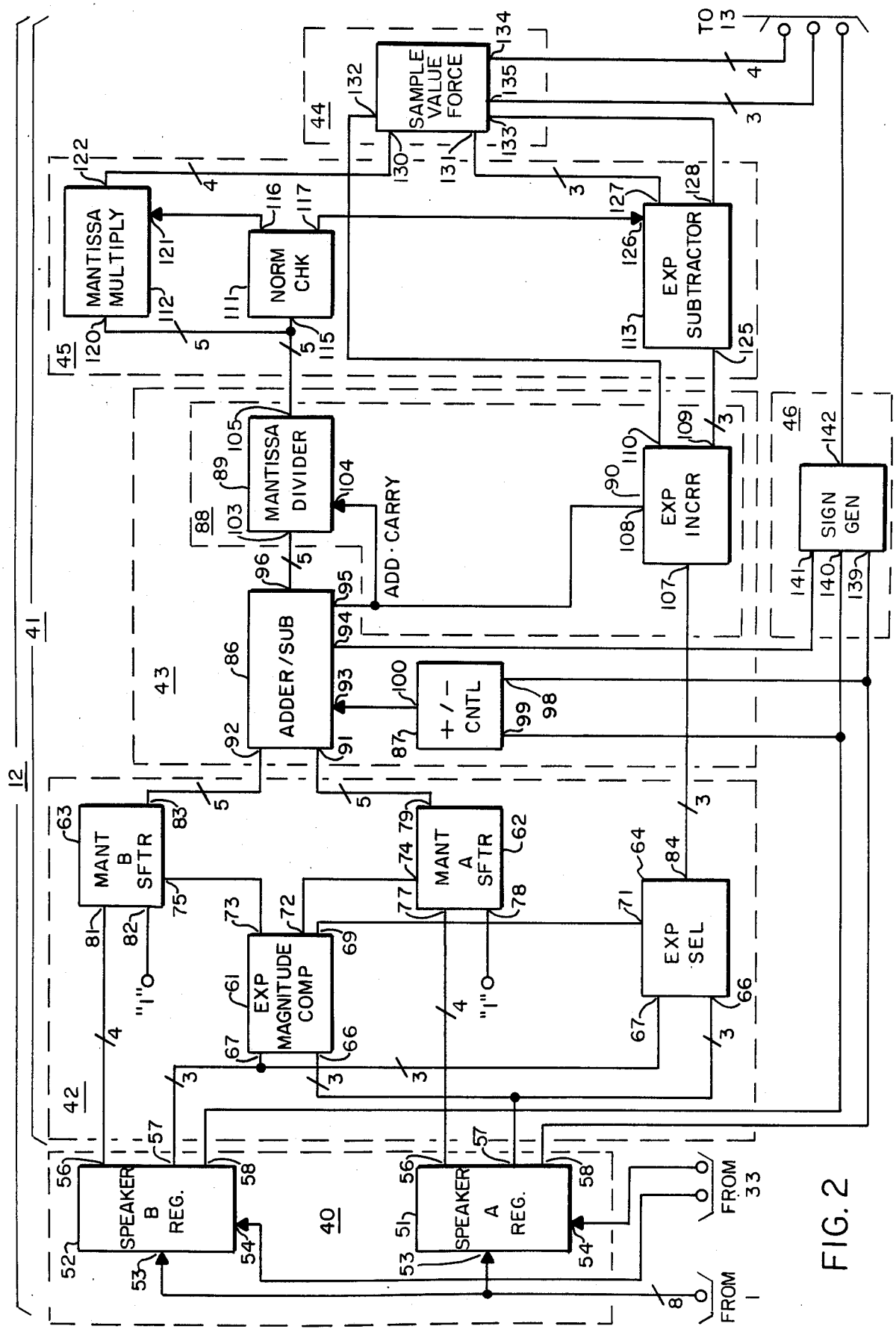
FIG. 2 is a block diagram of the conference circuit of the present invention.

Referring now to FIG. 2, the conference circuit 12 of the present invention includes an input sample store circuit 40 connected via inputs to the information memory 1 and via outputs to a conference adder 41. The conference adder 41 is connected to inputs of the PCM listening sample inverter circuit 13. The conference adder includes an exponent equalizer 42 connected to outputs of the input sample store 40, a mantissa adder/subtracter 43 connected to outputs of the exponent equalizer 42 and the input sample store 40, a sample value force circuit 44 connected to inputs of the PCM listening sample inverter circuit 13 and an input connected to an output of the mantissa adder/subtracter 43, a mantissa normalizer 45 connected to outputs of the exponent equalizer 43 and to inputs of the sample value force circuit 44, and a sign generator connected to the input sample store circuit 40 and the mantissa adder/subtracter 43, and via outputs to the PCM listening sample inverter circuit 13.

The input sample store circuit 40 includes a speaker A register 51 and a speaker B register 52, each register including an input 53 connected to the output of the information memory 1 and a register store control input 54 connected to an output of the network control 33. The speaker A and speaker B registers 51 and 52 additionally include a mantissa output bus 56 of four-bits, an exponent output bus 57 of three-bits and a sign output 58 of one-bit. The exponent equalizer 42 includes an exponent magnitude comparator 61, a mantissa A shifter 62, a mantissa B shifter 63 and an exponent selector 64. The exponent magnitude comparator 61 and the exponent selector 64 each include a first input 66 connected to the exponent bus output 57 of the speaker A register 51 and a second input 67 connected to the exponent bus output 57 of the speaker B register 52. The exponent magnitude comparator 61 includes an exponent select output 69 connected to an exponent select control input 71 of the exponent selector 64. Finally, the exponent magnitude comparator 61 includes a first shift control output 72 and a second shift control output 73 connected to shift control inputs 74 and 75 respectively of the mantissa A shifter 62 and the mantissa B shifter 63.

The add/subtract control 87 includes a first sign input 98 connected to the sign output 58 of the Speaker A register 51, and a second sign input 99 connected to the sign output 58 of the Speaker B register 52 and an add/subtract control output 100 connected to the add/subtract control input 93 of the adder/subtracter 86.

The mantissa divider 89 of the sample carry adjuster 88 includes an added mantissa input 103 connected to the added mantissa output 96 of the adder/subtracter 86, a mantissa divider control output 104 connected to the adjust control output 95 of the adder/subtracter 86 and a divided mantissa output 105.

The exponent imcrementer 90 includes a selected exponent input 107 connected to the selected exponent bus output 84 of the exponent selector 64, an increment control input 108 connected to the adjust control output 95 of the adder subtracter 86, an incremented exponent output 109 and an exponent overflow output 110.

The mantissa normalizer 45 includes a normalization check circuit 111, a mantissa multiply circuit 112 and an exponent subtracter 113. The normalizer check circuit 111 includes a divided mantissa input 115 connected to the divided mantissa output 105 of the mantissa divider 89, a mantissa multiply control output 116 and an exponent subtract control output 117.

The mantissa multiply circuit 112 includes a divided mantissa input 120 connected to the divided mantissa output 105 of the mantissa divider 89, a multiply control input 121 connected to the mantissa multiply control output 116 of the normalizer check circuit 111 and a normalized mantissa output 122.

The exponent subtracter 113 includes an incremented exponent input 125 connected to the incremented exponent output 109 of the exponent incrementer 90, an exponent subtract control input 126 connected to the subtract control output 117 of the normalizer check circuit 111, a normalized exponent output 127 and an exponent underflow control output 128.

The sample value force circuit 44 includes a normalized mantissa input 130 connected to the normalized mantissa 122 of the mantissa multiplier 112, a normalized exponent input 131 connected to the normalized exponent output 127 of the exponent subtracter 113, a maximum value control input 132 connected to the exponent overflow output 110 of the exponent incrementer 90, a minimum value control input 133 connected to the exponent underflow output 128 of the exponent subtracter 113, a conference mantissa output 134 and conference exponent output 135. The conference outputs 134 and 135 are connected to the inputs of the PCM listening sample inverter circuit 13 (shown in FIG. 1).

The sign generator 46 includes a first sign input 139 connected to the sign output 58 of the speaker A register 51, a second sign input 140 connected to the sign output 58 of the speaker B register 52, a signed control input 141 connected to the sign control output 94 of the adder/subtracter 86 and a sign output 142 connected to the input of the PCM listening sample inverter circuit 13 (shown in FIG. 1).

The operation of the conference circuit of the present invention will now be described with the assumption that the switching network of FIG. 1 has already been set up by an associated central processor to allow a conference between three subscribers. the method by which the call has been established is not important and could result from such types of conference applications as are known in the art such as progressive, meet-me or attendant (operator) conference. Although the conference operation will be described with reference to three subscribers of the PABX, it will be appreciated that trunk terminations may be substituted for the subscribers.

Referring to FIG. 1, the PABX system is driven by the network clock 30 which transmits a continuous stream of pulses to the time slot counter 31, the early time slot counter 32, the network control 33, and the channel enable 17. The time slot counter 31 counts the network clock pulses and generates a sequential series of memory addresses in response to the pulses. The early time slot counter 32 generates, in response to the network clock pulses, a sequential series of early addresses sequentially ahead of the addresses generated by the time slot counter. The network control 33 accepts clock pulses from the network clock 30 and it generates read and write signals for the information memory 1, the control A memory, the control B memory 3 and the channel memory 4 as well as register load signals for the channel enable register 18. The network control also generates multiplex control signals for the address multiplex 35, decode control signals for the channel enable 17 and register load signals for the conference circuit 12.

For purposes of the present discussion, assume that the first subscriber line circuit 26, the second subscriber line circuit 27 and the third subscriber line circuit 28 are all engaged in a three-way conversation with the data stored in the memories 1 through 4 as indicated in FIG. 1. In such an arrangement, the first subscriber line circuit 26 having an identity number of 41 will talk to the second and third subscriber line circuits 27 and 28 each identified as numbers 52 and 53 respectively and listen to those two subscribers. Similarly the second subscriber line circuit 27 will talk to the first and third subscriber line circuits 26 and 28 respectively and listen to those subscriber line circuits. Finally, the third subscriber line circuit will talk to the first and second subscriber line circuits 26 and 27 respectively and listen to those circuits.

Servicing the first subscriber line circuit 26 is accomplished during time slot number 01 when a talking sample from the first subscriber line circuit 26, converted by the analog-to-digital converter 7, is transmitted via the PCM input bus 8 through the PCM talking sample inverter circuit 9 and stored in the information memory 1 at the time slot address 01.

To accomplish the conversion of the talking sample of the first line circuit 26 from an analog form to a digital form, the channel memory 4 under control of the early time slot counter 32 will preaddress during a previous time slot (time slot 0 for example), the channel memory 4 at the address 1 to retrieve and pass the identity of the subscriber (number 41) assigned to line slot 01 to the channel enable register 18 where it will be stored under control of the network control 33. The channel enable register 18 will then transmit the subscriber identity therefrom via the channel enable bus 19 to the channel enable circuit 17 where under control of the network control 33, it causes the analog talking sample of the first subscriber line circuit 26 to be gated on to the transmit PAM bus 22 from where it propagates to the input of the analog-to-digital converter 7 and is converted in preparation for the next time slot (time slot 01).

During the time slot 01, the network control 33 will read the contents of the control A memory 2 (containing the address 04) and forward that information to the address multiplexer 35 from where, under control of the network control 33, it will be gated through and used to address the information memory 1. The talking sample stored in the information memory 1 at the control memory A specified location (location 01) will then be read out and forwarded to the conference circuit 12 for storage therein as described hereinafter. Finally, the network control 33 will read the control B memory 3 at the same time slot location, passing the therein contained address (the address 08) to the address multiplexer 35 where it will be gated through for use in addressing the information memory 1. The talking sample stored in the information memory 1 at the control memory B specified location (location 08) will then be read out under control of the network control 33 and also passed to the conference circuit 12 where it will be stored as herein after described. Lastly, a processed conference listening sample received from the output of the conference circuit 12 is passed through the PCM listening sample inverting circuit 13, the PCM output bus 14 to the digital-to-analog converter 11 where it is converted into an analog signal and transmitted to the first subscriber line circuit 26 over the receive PAM bus 23. Reception of the analog listening signal is accomplished by enabling the receive portion of the first subscriber line circuit 26 circuit via the channel enable circuit 17. Which is enabled in this regard by addressing during the time slot 01, the channel memory 4 at the time slot address (location 01), retrieving the line circuit identity (No. 41), loading the line circuit identity in the channel enable register 18 and finally transmitting the line circuit identity over the channel enable bus 19 to the channel enable circuit 17.

In similar manner the second line circuit 27 transmits an analog talking sample and receives a conference circuit processed listening sample from the first and third line circuits 26 and 28 respectively, during time slot 04. Finally, the third line circuit 28, during time slot 08 time, transmits a talking sample to the network information memory 1 and receives a conference circuit processed listening sample as described above thereby completing one frame of conference transmission processing.

Referring now to FIG. 2, processing of the two talking samples retrieved from the information memory 1 during each three-party conference time slot will be described.

Operation of the conference circuit 12 begins when the first talking sample, retrieved under control of the control A memory 2 from the information memory 1, is transmitted to the conference circuit 12 during the time slot 01. In this regard, the speech sample will propagate to the input 53 of the speaker A register 51 and be stored in that register under control of the network control 33 via the register store control input 54 of the speaker A register 51. Similarly, the speech sample retrieved from the information memory 1 via the address specified in the control B memory 3 will propagate to the input 53 of the speaker B register 52 and be stored in that register under control of the network control 33 via the register store input 54 of the speaker B register 52.

Once the speaker A and speaker B speech samples are stored in the the speaker A register 51 and the speaker B register 52 of input sample store 40, the samples will be each separated into three portions, a mantissa of 4-bits magnitude, an exponent of 3-bits magnitude and a sign portion of 1-bit magnitude. The speaker A and speaker B samples as separated will appear at a mantissa output 56, an exponent outpt 57 and a sign output 58 of each of the speaker A and speaker B registers 51 and 52 from which point they will propagate through the exponent equalizer 42, the mantissa adder/subtracter 43, the mantissa normalizer 45 and the sample value force circuit 44. The sign portion will propagate through the sign generator from the sample input store 40 to the PCM listening sample inverting circuit 13. Description of propagation of * the mantissa and exponent portions as well as propagation of the sign portion follows.

Addition of the speaker A and speaker B speech samples is accomplished by the conference adder 41 of which the exponent equalizer 42, the mantissa adder/- subtracter 43, the mantissa normalizer 45, the sample value force circuit 44 and the sign generator 46 comprise parts. The conference adder 41 forms the subject matter of co-pending application Ser. No. 687,877, as mentioned earlier, and will be described without reference to detailed implementation as such is covered in that application.

The first step in adding the speech samples is to equalize the exponents of the samples. This is accomplished by propagating the exponents to the inputs 66 and 67 of the exponent magnitude comparator 61 from the exponent outputs 57 of the speaker A and speaker B registers 51 and 52 respectively. The exponent magnitude comparator 61 will compare the exponents, select the exponent with the greatest absolute magnitude and generate a signal at an output 69 indicating which exponent has the greater magnitude. Additionally, the exponent magnitude comparator 61 will generate a mantissa shift equalization signal at one of the two equalization control outputs 72 or 73 corresponding to the output of the sample with the smallest magnitude exponent. The control signal appearing at the output will be generated in such a manner as to shift the mantissa portion of the smaller speech sample into proper position for addition with the larger speech sample. In this regard, if the A speech sample is of greater magnitude than the B speech sample, a shift control signal will appear at the output 73 of exponent magnitude comparator 61 and propagate to the shift control input 75 of the mantissa B shifter 63. The control signal will operate on the mantissa portion of the speaker B sample appearing at the input 82 of the mantissa B shifter 63 from the output 56 of the speaker B register 52 to shift the B speech sample mantissa into proper position at the output 83 of the mantissa B shifter. In this case, the speaker A mantissa portion appearing at the output 56 of the speaker A register 51 will propagate to the input 80 of the mantissa A shifter 62 and be transmitted by the mantissa A shifter 62 to the output 79 unmodified.

The control signal at the output 69 of the exponent magnitude comparator 61 will be propagated to the input 71 of the exponent selector 64 and enable propagation of the exponent portion of the speaker A sample appearing at the output 57 of the speaker A register 51 to the input 66 of the exponent selector 64 and therefrom to the output 84 of the exponent selector 64, blocking the B speech sample exponent appearing at the output 57 of the speaker B register 52 and propagated to the inpu 67 of the exponent selector 64.

At this point the equalized mantissa portions and the selected exponent portion, and the sign portions appearing at the outputs 58 of the speaker A and B registers 51 and 52 will propagate to the mantissa adder/subtracter circuit 43.

The sign signals propagating to the mantissa adder/subtracter circuit 43 will appear at the inputs 98 and 99 of the add/subtract control 87. In response to the sign signals, the add/subtract control 87 will generate an add/subtract signal at the output 100 from where it will be propagated to the input 93 of the adder/subtracter 86. The adder/subtracter 86 will accept mantissa signals from the output 79 of the mantissa A shifter 62 via an input 91 and from the mantissa B shifter output 83 via a input 92, and add or subtract the two mantissa samples as directed by the signal received on the add/subtract control via the input 93. The sum or difference of the equalized mantissas will appear at the output 96 of the adder/subtracter 86 along with a carry signal at an output 94 for use by the sign generator 46 and a summation-carry signal at an output 95. The mantissa adder/subtracter 43 also includes an sample carry adjuster 88 including a mantissa divider 89 and an exponent incrementer 90.

The mantissa divider 89 receives the combined (added or subtracted) mantissa appearing at the output 96 of the adder/subtracter 86 via an input 103 and the summation-carry signal from the output 95 of the adder/subtracter 86 via an input 104. The exponent incrementer 90 accepts the selected exponent appearing at the output 84 of the exponent selector 64 via an input 107 and the summation carry signal via an input 108.

In the event that the summation-carry signal is generated, the mantissa divider 89 will divide the mantissa by the value two and increment the exponent by the value one to adjust for a carry out of the adder/subtracter 86. After adjusting, the adjusted mantissa will appear at the output 105 of the mantissa divider and the adjusted exponent will appear at the output 109 of the exponent incrementer 90. The exponent incrementer 90 will additionally generate an exponent overflow signal at the output 110 in the event the exponent overflows its maximum value when incremented as described. In the event no summation--carry signal is generated, the combined mantissa and a selected exponent will be passed through the mantissa divider 89 and the exponent incrementer 90 unchanged.

The adjusted mantissa and exponent will next appear at the inputs of the mantissa normalizer 45. More specifically, the adjusted mantissa appearing at the output 105 of the mantissa divider 89 will appear at the input 115 of the normalizer check circuit 111 and the input 120 of the mantissa multiplier 112. The adjusted exponent appearing at the output 109 of the exponent incrementer 90 will appear at the input 125 of the exponent subtracter 113. The normalizer check circuit will analyze the adjusted mantissa to determine if it is in a normalized form and if not, the normalization check circuit 111 will generate a signal at the output 116 indicating that the mantissa requires multiplication and a signal at the output 117 indicating that the exponent requires subtraction, both signals additionally indicating the magnitude of the operation needed. The mantissa multiplier 112, upon receipt of a multiply magnitude signal via the input 121, will generate a normalized mantissa at the output 122. In similar fashion the exponent subtracter 113 upon receipt of a exponent subtraction magnitude signal via the input 126 will generate a normalized exponent at the output 127. In the event the result of the subtraction process is an underflow, the exponent subtracter 113 will additionally generate an exponent underflow signal at the output 128.

Following normalization, the sample will be presented to the sample value force circuit 44 via the mantissa input 130 and the exponent input 131. An exponent overflow input 132 is provided and an exponent underflow input 133 is provided. In the event of receipt of an exponent overflow or underflow signal via the input 132 or 133, respectively, the sample value force circuit 44 will generate a maximum or minimum sample value and present that value to the input of the PCM listening sample inverter circuit 13 (see FIG. 1) via the PCM listening sample mantissa output 134 and the PCM listening sample exponent output 135.

Finally, the sign generator 46 will accept the sign signal appearing at the output 58 of the speaker A register 51 via the input 139, the sign signal appearing at the output 58 of the speaker B register 52 via the input 140 and the carry signal generated by the adder/subtracter 86 and appearing at the output 94 of that circuit via the input 141. From the mentioned inputs, the sign generator 46 will generate a PCM listening sample sign signal at the output 142 from where it will propagate to the PCM listening sample inverter circuit 13 (see FIG. 1).

Although the preferred embodiment of the invention has been illustrated and the form described in detail, it will be readily apparent to those skilled in the art that various modifications may be made therein without departing from the spirit of the invention or from the scope of appended claims.

What is claimed is:

1. A three-way conference circuit for a pulse code modulated communications system including an information memory including an input, an output and a plurality of addressed storage locations each accessed during an associated different time slot, at least one channel including a plurality of time divisions connected to said information memory input and including an input, at least three subscriber terminations connected to said channel each termination providing a talking sample and accepting a listening sample, and a control means connected to said channel, to said information memory and to said terminations, said conference circuit comprising:
    a first speaker register connected to said information memory output via an input, to said control means via a control line and including an output;
    a second speaker register connected to said information memory output via an input, to said control means via a control line and including an output;
    a first means included in said control means, operated during a first one of said given time slots to operate said information memory to read said talking samples of said second and said third terminations from said memory and to store said talking samples in said first and said second speaker registers respectively;
    a conference adder connected via a first and a second input to said first and said second speaker register outputs respectively and to said channel input via an output, said adder operated to add said stored talking samples to thus produce a first listening sample and to extend said listening sample to said channel input via said conference adder output whereby said first termination will receive said first listening sample comprised of said talking samples of said second and said third terminations.

2. A conference circuit as claimed in claim 1, wherein: said control means further includes a second means operated during a second one of said given time slots, to read said talking samples of said first and said third terminations from said information memory and to store said talking samples in said first and said second speaker registers respectively, and said conference adder is further operated to add said register stored talking samples to thus produce a second listening sample and to extend said listening sample to said channel inputs via said conference adder output whereby said second termination will receive said second listening sample comprised of said talking samples of said first and said third terminations.

3. A conference circuit as claimed in claim 2, wherein: said control means still further includes a third means operated during a third one of said time slots, to read said talking samples of said first and said second terminations from said information memory and to store said talking samples in said first and said second speaker registers respectively, and said conference adder is further operated to add said register stored talking samples to thus produce a third listening sample and to extend said listening sample to said channel inputs via said conference adder output whereby said third termination will receive said third listening sample comprised of said talking samples of said first and said second terminations.

4. A conference circuit as claimed in claim 1, wherein: said talking samples each include a sign portion, an exponent portion and a mantissa portion and said conference adder comprises:
    an exponent equalizer including
        an exponent magnitude comparator connected to said first and said second speaker registers, and operated to select one of said exponents from said PCM samples stored in said registers, to provide signals representative of a difference in values of said exponents, and to provide exponent selection signals identifying a selected one of said first and second stored exponents,
        a first and a second mantissa shifter, each connected to a respective one of said speaker registers and to said exponent magnitude comparator, and operated in response to said exponent difference signals to shift the mantissa not associated with said selected exponent by a number of bit positions equal to said difference in exponent values, whereby the mantissa of one sample is adjusted to reflect an exponent of the same value as said selected exponent, and
        an exponent selector connected to said first and said second speaker registers and to said exponent magnitude comparator, and operated in response to said exponent selection signals to select a coresponding one of said stored exponents and to generate a signal at a selected exponent output representative of the selected exponent;
    a mantissa adder/subtracter including
        an add/subract control connected to said first and said speaker registers, and operated in response to said talking samples to compare said register stored talking sample sign bits, to generate an add signal when said bits are alike in value and to generate a subtract signal when said bits are different in value,
        an adder/subtracter, connected to said first and said second mantissa shifters and to said add/subtract control, and operated in response to said subtract signal to generate a mantissa difference signal representative of the difference between said shifted mantissa and a mantissa associated with said selected exponent at a mantissa ouput, said mantissa adder/subtracter further operated in response to said add signal to generate a mantissa summation signal representative of the sum of said shifted mantissa and said mantissa associated with said selected exponent at said mantissa output, said mantissa adder/subtracter further operated in response to said shifted mantissa, to said mantissa associated with said selected exponent, and to said add signal and in the alternaive to said subtract signal, to produce a carry signal indicative of a carry out of said mantissa adder/subtracter, said mantissa adder/subtracter still further operated to provide a summation-carry signal at a sum-carry output indicative of a carry condition existing during generation of said mantissa summation signal;

a sample carry adjuster including
- a mantissa divider connected to said mantissa adder/subtracter, responsive to said mantissa summation signal and to said summation-carry signal to generate an adjusted mantissa by dividing said mantissa summation signal by the value two, and
- an exponent incrementer connected to said exponent selector and to said mantissa adder/subtracter, responsive to said selected exponent and to said summation-carry signal to generate an adjusted exponent by incrementing said selected exponent by the value one, said exponent incrementer further operated in response to generation of a carry condition in generating said adjusted exponent to generate an exponent overflow signal; and a sign bit generator connected to said first and said second speaker registers and to said mantissa adder/subtracter, and operated in response to said register stored talking samples and carry signal to provide a sign bit representative of the sign of said listening sample.

5. A conference circuit as claimed in claim 4, wherein: there is further included a mantissa normalizer including:
- a normalization check circuit coupled to said mantissa adder/subtracter, and operated to provide a mantissa multiply signal representative of the multiplier required to provide a resultant mantissa of a predetermined minimum value and to provide a subtrahend related in a predetermined manner to said mantissa multiply signal;
- a mantissa multiplier coupled to said mantissa adder/subtracter and to said normalization check circuit, and operated in response to said multiply signals to provide said resultant mantissa; and
- an exponent subtracter connected to said exponent incrementer and to said normalization check, operative to generate a resultant exponent by subtracting said subtrahend from said adjusted exponent, said exponent subtracter further operative to generate an exponent underflow signal upon generation of a negative value for said resultant exponent.

6. A conference circuit as claimed in claim 5, wherein: said conference adder further includes a sample value force circuit connected to said mantissa multiplier, to said exponent subtracter and to said exponent incrementer, operated in response to said exponent overflow signal to generate a listening value of a predetermined maximum value, and further operated in response to said exponent underflow signal to generate a listening value of a predetermined minimum value.

* * * * *